United States Patent [19]
Odaka

[11] Patent Number: 5,497,210
[45] Date of Patent: Mar. 5, 1996

[54] APPARATUS WITH FOCUS DETECTION MEANS AND SIGHT AXIS DETECTION MEANS

[75] Inventor: Yukio Odaka, Yokohama, Japan

[73] Assignee: Canon Kabushiki Kaisha, Tokyo, Japan

[21] Appl. No.: 357,152

[22] Filed: Dec. 15, 1994

Related U.S. Application Data

[63] Continuation of Ser. No. 970,029, Nov. 2, 1992, abandoned.

[30] Foreign Application Priority Data

Nov. 6, 1991 [JP] Japan .................................... 3-318320
Nov. 6, 1991 [JP] Japan .................................... 3-318322

[51] Int. Cl.$^6$ .................................................. G03B 13/36
[52] U.S. Cl. ........................ 354/402; 354/410; 354/219; 354/62
[58] Field of Search ............................ 354/402, 62, 219, 354/410, 400

[56] References Cited

U.S. PATENT DOCUMENTS

| | | | |
|---|---|---|---|
| 3,936,849 | 2/1975 | Tsujimoto | 354/402 |
| 4,180,309 | 12/1979 | Miyata et al. | 354/402 |
| 4,574,314 | 3/1986 | Weinblatt | 354/400 |
| 4,828,381 | 5/1989 | Shindo | 354/62 |
| 5,036,347 | 7/1991 | Tsunekawa et al. | 354/62 |
| 5,182,443 | 1/1993 | Suda et al. | 354/62 |
| 5,214,466 | 5/1993 | Nagano et al. | 354/62 |

FOREIGN PATENT DOCUMENTS

| | | | |
|---|---|---|---|
| 61-61135 | 3/1986 | Japan | G03B 3/00 |
| 1-241511 | 9/1989 | Japan | G02B 7/11 |
| 1-274736 | 11/1989 | Japan | A61B 3/10 |

*Primary Examiner*—Russell E. Adams
*Attorney, Agent, or Firm*—Fitzpatrick, Cella, Harper & Scinto

[57] ABSTRACT

Apparatus with focus detection circuitry and sight axis detection circuitry includes multi-point focus state detection circuitry for detecting focus states of an objective lens for a plurality of areas in a field of view. Sight point detection circuitry is provided for detecting a sight point state (e.g., visual axis) of an observer. Control circuitry is provided for executing, in parallel, a detection operation of the multi-point focus state detection circuitry and a detection operation of the sight point detection circuitry.

14 Claims, 10 Drawing Sheets

APPARATUS WITH FOCUS DETECTION MEANS AND SIGHT AXIS DETECTION MEANS

This application is a continuation of application Ser. No. 07/970,029 filed Nov. 2, 1992, now abandoned.

BACKGROUND OF THE INVENTION

1. Field of the Invention

The present invention relates to a camera having a focus detection means and a sight axis detection means and, more particularly, to a camera suitable for a photographing camera, a video camera, an SV camera, and the like. Wherein the sight axis detection means detects the sight axis direction of a photographer who looks into a finder field so as to obtain a gazing direction and a gazing point in the finder field; One of a plurality of focus detection signals obtained by the focus detection means having a function of detecting the focusing state on a plurality of areas of an object is selected on the basis of the signal obtained from the sight axis detection means so as to adjust the focusing state of a photographing system.

RELATED BACKGROUND ART

Conventionally, various cameras, in each of which a sight axis detection means arranged in the camera detects the sight axis direction of a photographer to detect which area (position) in a finder field the photographer observes, i.e., so-called the gazing direction of the photographer, and various photographing functions such as an auto-focus adjustment function, an auto-exposure function, and the like are controlled on the basis of the signal from the sight axis detection means, have been proposed.

For example, Japanese Laid-Open Patent Application No. 61-61135 proposed a camera which mechanically controls the distance measuring direction of a focus detection device on the basis of an output signal from a sight axis detection means so as to adjust the focusing state of a photographing system.

The present assignee proposed, in Japanese Laid-Open Patent Application No. 1-241511, a camera, which comprises a sight axis detection means for detecting the gazing direction of a photographer, a focus detection means having a plurality of distance measuring fields, and an auto-exposure control means having a plurality of photometric sensitivity distributions, and controls the driving operation of the focus detection means or the auto-exposure control means on the basis of the output signal from the sight axis detection means.

In a conventional camera, photographing conditions for focus adjustment, exposure control, and the like are automatically set with reference to the central area in the finder field. However, in a camera proposed in the above patent application, an arbitrary area (in some cases, a large number of areas) in the finder field is selected on the basis of the photographer's choice, and focus adjustment, exposure control, and the like are performed with reference to the selected area. A composition as the most important factor upon image formation is determined independently of an automatic control method to perform a photographing operation under a condition intended by a photographer.

In general, a camera having an auto-focus detection means adopts a method of controlling signal processing (A) associated with auto-focus detection, and signal processing (B) associated with a photometry operation, a switch sense operation, and the like as a processing flow.

When a sight axis detection function of controlling to, e.g., automatically switch a plurality of distance measuring areas using sight axis information of a photographer is added to such a camera, the signal processing (A) associated with auto-focus detection, the signal processing (B) associated with a photometry operation, a switch sense operation, and the like, and signal processing (C) associated with an input operation of sight axis information are controlled as a processing flow.

In a sequence of the camera for repetitively executing the signal processing (C) associated with the input operation of sight axis information, the signal processing (A) associated with auto-focus detection, and the signal processing (B) associated with a photometry operation, a switch sense operation, and the like as a processing flow, the interval of each signal processing is prolonged as compared to a sequence of a camera having no sight axis detection means. For this reason, the response time of each function is prolonged.

For example, when the object brightness is decreased, the processing time of the focus detection control is prolonged, and the processing interval of the sight axis detection means is considerably delayed, thus prolonging the response time of detection of a gazing point (sight axis).

SUMMARY OF THE INVENTION

It is an object of the present invention to provide an apparatus, which can optimize signal processing operations of focus detection control and sight axis detection control, and can execute both the focus detection control and the sight axis detection control in a short response time without considerably delaying each detection control period.

In order to achieve this object, the present invention discloses an embodiment for parallelly executing a sight axis detection operation and a focus detection operation.

In this case, when an area selected by a sight axis detection means is, e.g., a low-contrast object, focus detection may be disabled. In order to avoid such a situation, the present invention also discloses an embodiment for, when an area selected by the sight axis detection means disables a distance measuring operation, selecting an adjacent area to perform focus adjustment.

DETAILED DESCRIPTION OF THE PREFERRED EMBODIMENTS

Figure 1:
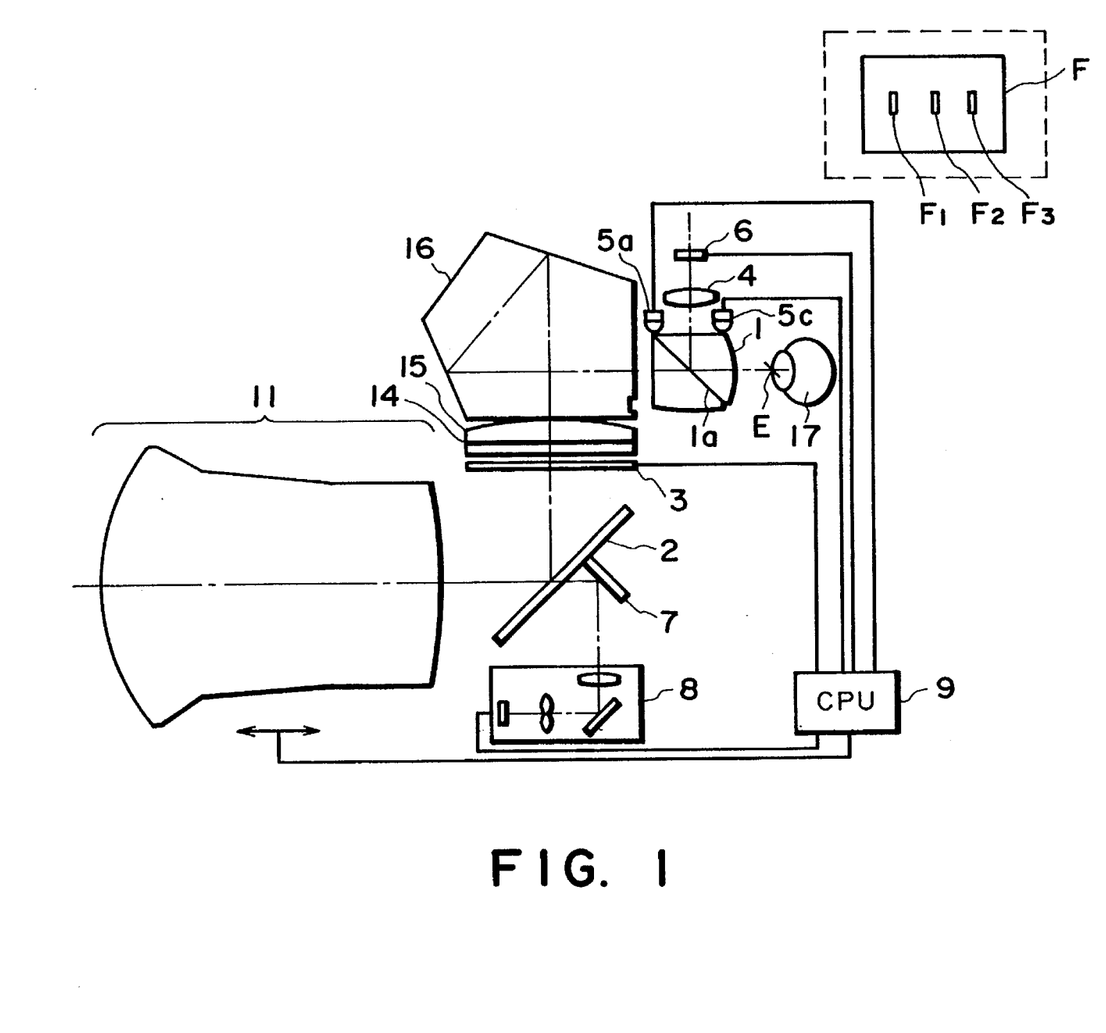
FIG. 1 is a schematic sectional view of the first embodiment in which the present invention is applied to a single-lens reflex camera.
Figure 2:
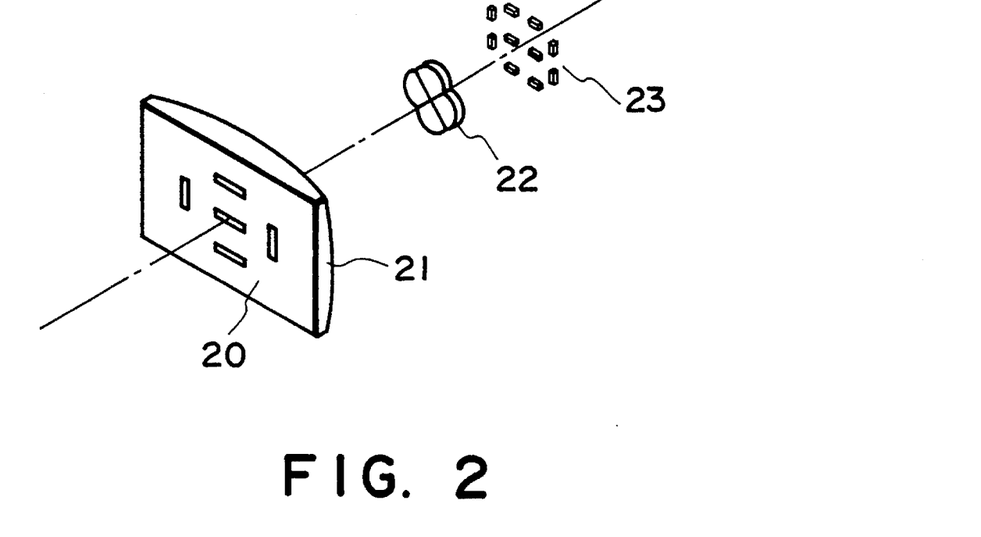
FIG. 2 is a partial explanatory view of FIG. 1.
Figure 3:
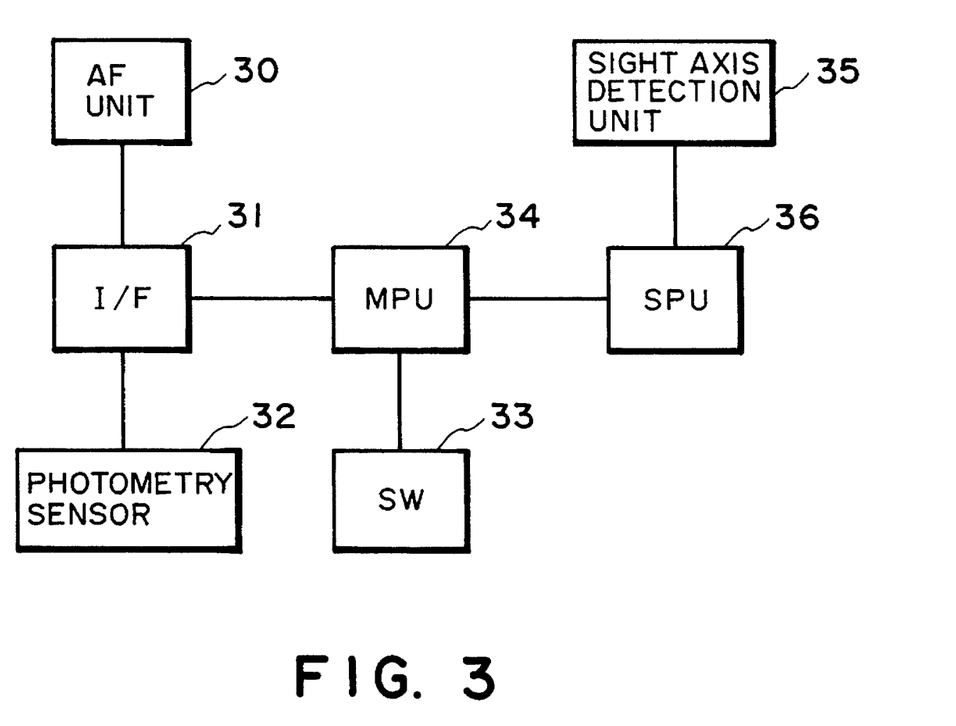
FIG. 3 is a block diagram showing a main part of the present invention.

FIG. 1 is a schematic sectional view of the first embodiment in which an apparatus of the present invention is applied to a single-lens reflex camera, FIG. 2 is a partial explanatory view of FIG. 1, and FIG. 3 is a block diagram showing a main part of the present invention.

In FIG. 1, a camera includes an eyepiece lens 1 in which a dichroic mirror 1a for transmitting visible light and reflecting infrared light is obliquely arranged. The eyepiece lens 1 also serves as an optical path splitter.

The camera also includes a light-receiving lens 4, illumination means 5 (5a, 5b (not shown), and 5c), which comprise light-emitting diodes, and a photoelectric element array 6. The light-receiving lens 4 and the photoelectric element array 6 constitute a light-receiving means. As the photoelectric element array 6, a device including a linear array of a plurality of photoelectric elements in a direction perpendicular to the drawing surface is normally used. Alternatively, a device including a two-dimensional matrix of photoelectric elements may be used as needed. The components 1, 4, 5, and 6 constitute an eyeball sight axis detection system (sight axis detection means).

The camera further includes a photographing lens 11, a quick return (QR) mirror 2, a display element 3, a focusing screen 14, a condenser lens 15, a pentagonal roof prism 16, a sub mirror 7, and a focus detection device 8 capable of detecting a focusing state of the photographing lens for a plurality of areas ($F_1$, $F_2$, and $F_3$) in a finder F.

In the focus detection device 8, a field mask 20, which is arranged near a prospective image formation plane of the photographing lens 11, and has a plurality of slits for respectively determining distance measuring areas, is arranged adjacent to a lens member 21 serving as a field lens for an image in each slit, and a set 22 of re-image formation lenses and a set 23 of photoelectric element arrays corresponding in number to the slits are arranged in the order named, as shown in FIG. 2. The field mask 20, the lens member 21, the set 22 of the re-image formation lenses, and the set 23 of the photoelectric element arrays constitute a known focus detection system.

In this embodiment, some light components of object light transmitted through the photographing lens 11 are reflected by the QR mirror 2, and form an object image near the focusing screen 14. The object light diffused by the diffusion surface of the focusing screen 14 is guided to an eye point E through the condenser lens 15, the pentagonal roof prism 16, and the eyepiece lens 1.

The display element 3 comprises a two-layered type guest-host type liquid crystal element using no polarization plate, and displays the distance measuring areas (focus detection positions) in the finder field F.

Some light components of object light transmitted through the photographing lens 11 are transmitted through the QR mirror 2, are reflected by the sub mirror 7, and are then guided to the above-mentioned multi-point focus detection device 8 arranged in a bottom portion of a camera main body. Furthermore, the photographing lens 11 is extended (or collapsed) by a known photographing lens driving device on the basis of focus detection information at the position on an object plane selected by the multi-point focus detection device 8 or a sight axis detection device, thus performing focus adjustment.

The sight axis detection device according to this embodiment is constituted by the sight axis detection system constituted by the members 1, 4, 5, and 6, and an eyeball optical axis detection circuit, an eyeball discrimination circuit, a sight axis correction circuit, a gazing point detection circuit, and the like which circuits are included in a signal processing circuit 9 as an arithmetic means.

The details of a sight axis detection method of this embodiment are described in Japanese Laid-Open Patent Nos. 1-241511, 1-274736, and the like proposed by the present applicant.

More specifically, infrared light emitted from the infrared light-emitting diodes 5 is incident from above in FIG. 1 onto the eyepiece lens 1, is reflected by the dichroic mirror 1a, and illuminates an eyeball 17 of an observer located near the eye point E. The infrared light reflected by the eyeball 17 is reflected by the dichroic mirror 1a, and forms an image (Purkinje image) on the photoelectric element array 6 while being converged by the light-receiving lens 4. The signal processing circuit 9 is executed by software of a microcomputer.

Gazing point information detected by the gazing point detection circuit is supplied to the display element 3 and the multi-point focus detection device 8. The display element 3 displays the gazing point of the observer in the finder of the camera, and serves to confirm the gazing point (focus detection point).

In the multi-point focus detection device 8, focus adjustment is performed for a gazed object at the point gazed at by the observer according to a flow to be described later.

The basic operation of the present invention will be described below with reference to the block diagram of FIG. 3.

In FIG. 3, a sight axis detection unit 35 detects the sight axis of the observer. A sub microprocessor unit (SPU) 36 includes a sight axis arithmetic circuit, and receives sight axis information from the sight axis detection unit 35.

A microprocessor unit (MPU) 34 includes a photometry arithmetic circuit, a distance-measurement arithmetic circuit (focus detection circuit), and the like, and receives various kinds of information from a photometry sensor 32 and a focus detection (AF) unit 30 through an interface 31.

The MPU 34 and the SPU 36 exchange signals as needed. A switch means 33 performs various photographing operations of the camera. More specifically, the switch means 33 supplies a first signal from a first switch (SW1) of a release switch (not shown) and a second signal from a second switch (SW2) thereof to the MPU 34.

Various operations of the present invention will be described below with reference to the flow charts shown in FIGS. 4 to 7.

Figure 4:
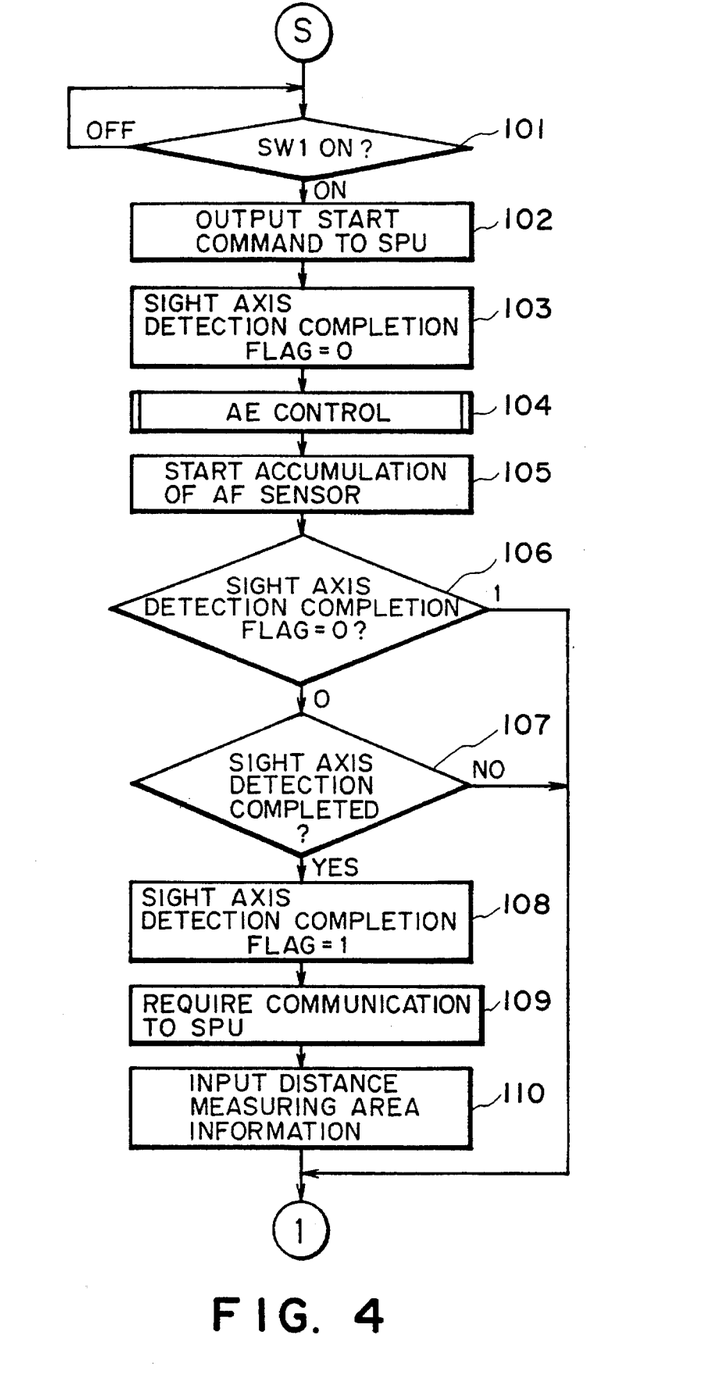
FIGS. 4 to 9 are flow charts showing operations of the present invention.
Figure 5:
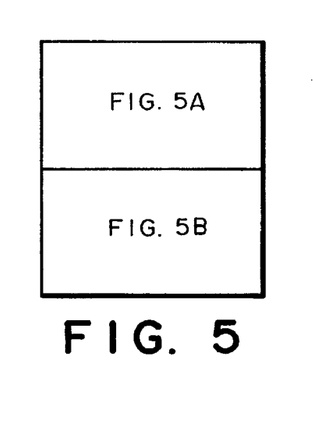
Figure 5A:
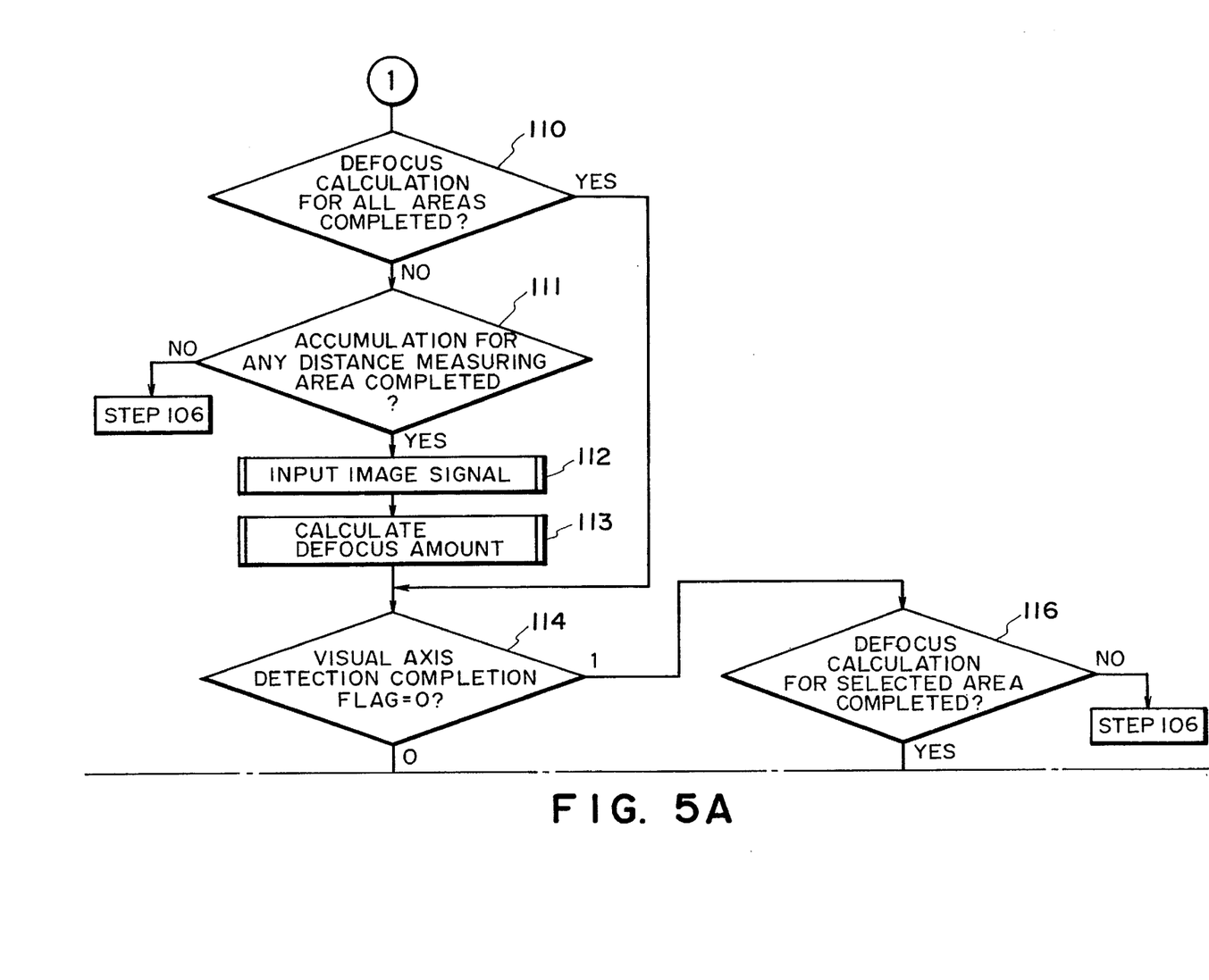
Figure 5B:
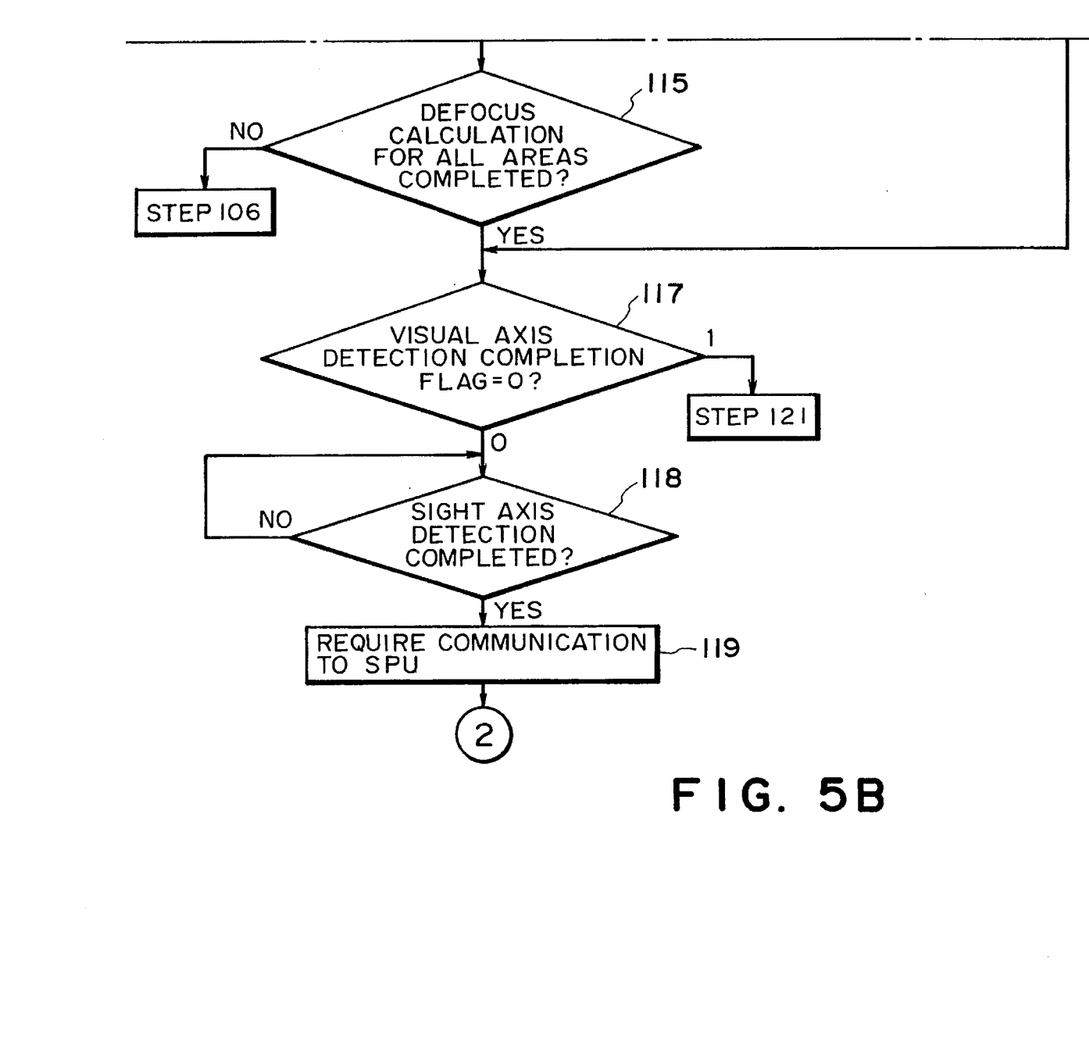
Figure 6:
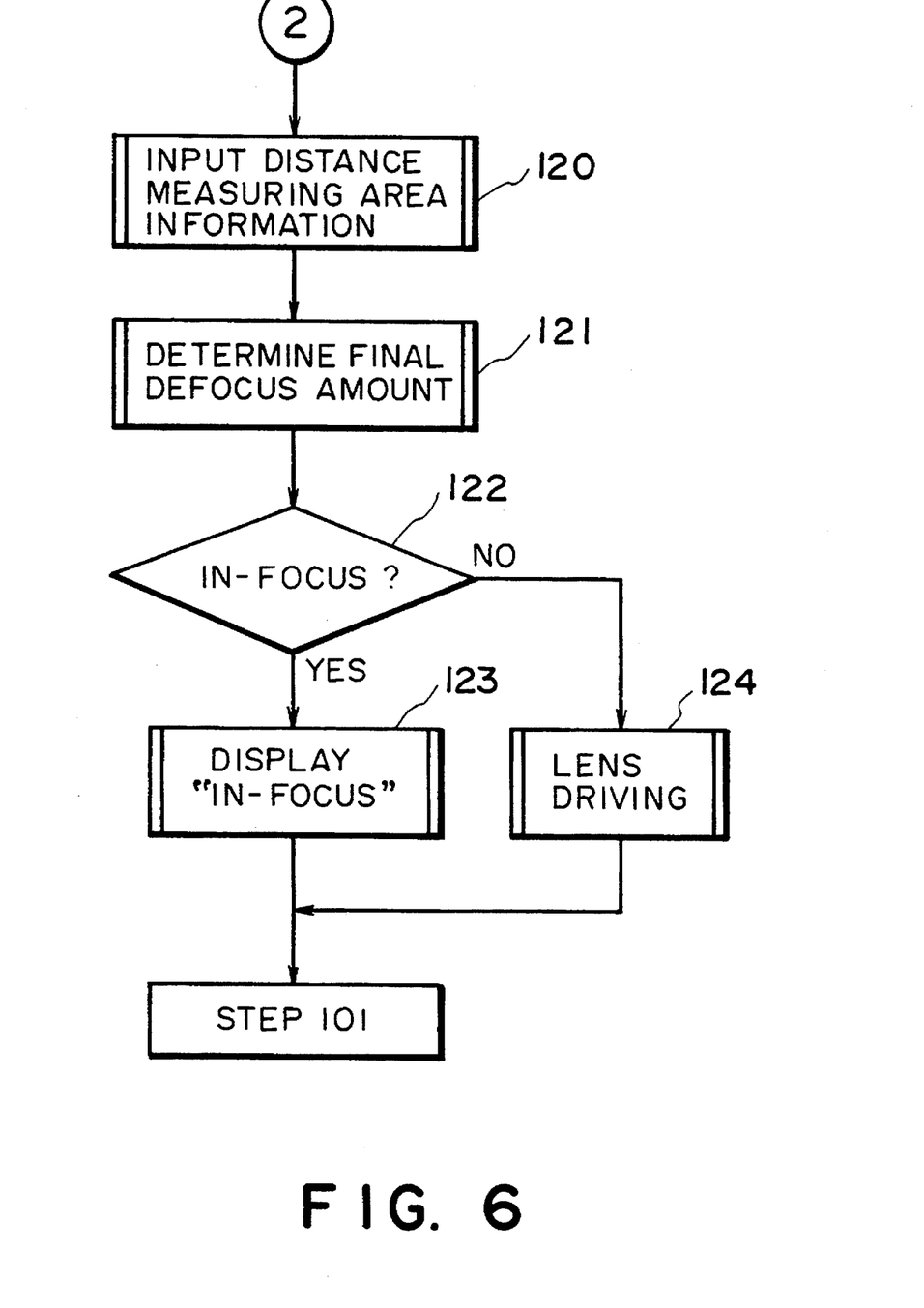
Figure 7:
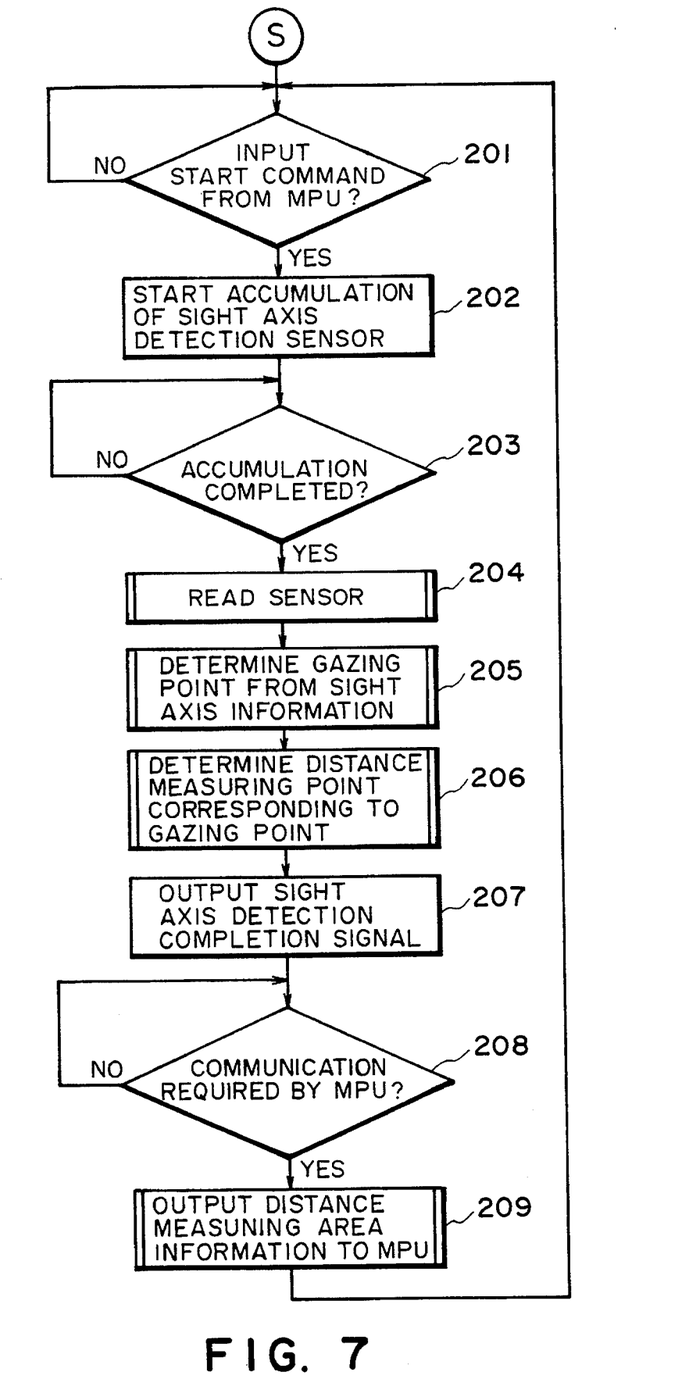

FIGS. 4 to 6 are flow charts for mainly performing AE control and AF control, and FIG. 7 is a flow chart for mainly performing sight axis detection control.

When the camera receives basic operation signals, and the circuits shown in FIG. 3 receive a power supply voltage, the MPU 34 starts execution of processing from step 101 in FIG. 4. At the same time, the SPU 36 starts execution of processing from step 201 in FIG. 7. More specifically, the MPU 34 and the SPU 36 respectively start independent control operations.

The control of the MPU 34 will be described below with reference to the flow charts shown in FIGS. 4 to 6. In step 101 in FIG. 4, the state of the first switch SW1 which is turned on when the release button of the switch means 33 is depressed to its first-stroke position is checked. If the first switch SW1 is OFF, step 101 is repetitively executed until the first switch SW1 is turned on. If the first switch SW1 is ON, the flow advances to step 102. In step 102, a command is output to the SPU 36 to cause it to execute sight axis detection. The processing of the SPU 36 will be described later.

The flow then advances to step 103 to clear a sight axis detection completion flag. This flag indicates that the sight axis detection is completed, and distance measuring area information is input from the SPU 36. The flow advances to step 104 to execute an "AE control" subroutine. In the "AE control" subroutine, known control operations such as photometry, detection of switch states, display, and the like are performed. However, since these control operations are not directly related to the present invention, a detailed description thereof will be omitted.

In step 105, the accumulation operation of a plurality of pairs of AF sensors (focus detection sensors) is started to perform focus detection. In step 106, the sight axis detection completion flag is checked. If the flag is "1", since the distance measuring area information has already been input, the flow advances to step 110-②. If it is determined in step 106 that the flag is "0", since no distance measuring area information has been input yet, the flow advances to step 107 to check if the sight axis detection processed by the SPU 36 is completed. If N (NO) in step 107, the flow advances to step 110-②. However, if Y (YES) in step 107, the distance measuring area information based on the sight axis detection is input from the SPU 36.

In step 108, "1" is set in the sight axis detection completion flag to store that the distance measuring area information is stored. In step 109, a signal for requesting a communication of the distance measuring area information is output to the SPU 36. In step 110, the distance measuring area information is input from the SPU 36.

In step 110-② in FIG. 5, it is checked if defocus calculations for all the distance measuring areas are completed. If Y in step 110-②, the flow advances to step 114; otherwise, the flow advances to step 111.

In step 111, it is checked if the accumulation of a sensor corresponding to one of the plurality of distance measuring areas is completed. If it is determined in step 111 that there is no sensor which has just completed the accumulation, the flow returns to step 106; otherwise, the flow advances to step 112 to input an image signal of an object of the corresponding distance measuring area.

In step 113, a defocus amount is calculated by a known method on the basis of the image signal of the object. A detailed description of a process for calculating the defocus amount will be omitted here. In step 114, the sight axis detection completion flag is checked. If it is determined in step 114 that the flag is "0", the flow advances to step 115; if the flag is "1", the flow advances to step 116.

In step 115, it is checked if the defocus calculations of all the distance measuring areas are completed. If it is determined in step 115 that a distance measuring area, for which a defocus calculation is not completed, still remains, the flow returns to step 106; otherwise, the flow advances to step 117.

In step 116, it is checked if the defocus calculation of the distance measuring area selected by the sight axis detection processing is completed. If N in step 116, the flow returns to step 106; otherwise, the flow advances to step 117.

In step 117, the sight axis detection completion flag is checked. If the flag is "0", since no distance measuring area information is input, the flow advances to step 118; if the flag is "1", since the distance measuring area information has already been input, the flow jumps to step 121. In step 118, the control waits until the sight axis detection processing processed by the SPU 36 is completed. When the sight axis detection processing is completed, the flow advances to step 119, and a request signal for requesting a communication of the distance measuring area information is output to the SPU 36.

In step 120 in FIG. 6, the distance measuring area information selected based on the gazing point of a photographer is input from the SPU 36. In step 121, the defocus amount of the distance measuring area obtained based on the gazing point of the photographer is determined as a defocus amount to be finally controlled.

In step 122, it is checked if the photographing lens is in an in-focus state. If Y in step 122, an in-focus display is made in step 123; otherwise, the flow advances to step 124 to drive the lens. Upon completion of these processing operations, the flow returns to step 101.

Control of the SPU 36 will be described below with reference to the flow chart shown in FIG. 7.

Step 201 in FIG. 7 is repetitively executed until a command for starting execution of the sight axis detection is input from the MPU 34. If the command for starting execution of the sight axis detection is input, the flow advances to step 202 to execute sight axis detection control.

In step 202, the accumulation of a sensor for inputting sight axis information is started. In step 203, the control waits until the accumulation of the sensor for inputting sight axis information is completed. If the accumulation is completed, the flow advances to step 204 to read the sensor for inputting the sight axis information. In step 205, an operation for obtaining the gazing point of the photographer is executed on the basis of the output from the sensor for inputting the sight axis information. In step 206, a distance measuring area corresponding to the gazing point of the photographer is determined.

In step 207, a signal indicating completion of sight axis detection is output to the MPU 34. In step 208, the control waits until the communication request signal is input from the MPU 34. When the communication request signal is input from the MPU 34, the distance measuring area information obtained based on the gazing point of the photographer is output to the MPU in step 209. Upon completion of these processing operations, the flow returns to step 201.

As described above, according to this embodiment, when the signal processing operations of a focus detection means and a sight axis detection means are independently performed, one signal processing operation is controlled upon completion of the other signal processing operation, as described above. Thus, a camera, which has the focus detection means and the sight axis detection means, can optimize the signal processing operations of the focus detection means and the sight axis detection means, and can perform both focus detection control and sight axis detection control in a short response time without considerably delaying the period of each detection control, can be realized.

Another embodiment of the present invention will be described below. When a photographer holds a camera to perform a photographing operation, precise focus detection is often disabled due to a camera shake by the photographer or when a low-contrast object is present in a certain focus area. This embodiment can solve such a problem. More specifically, in this embodiment, when focus detection for a selected area is disabled, control is made to perform focus detection for an area adjacent to the selected area.

Figure 8:
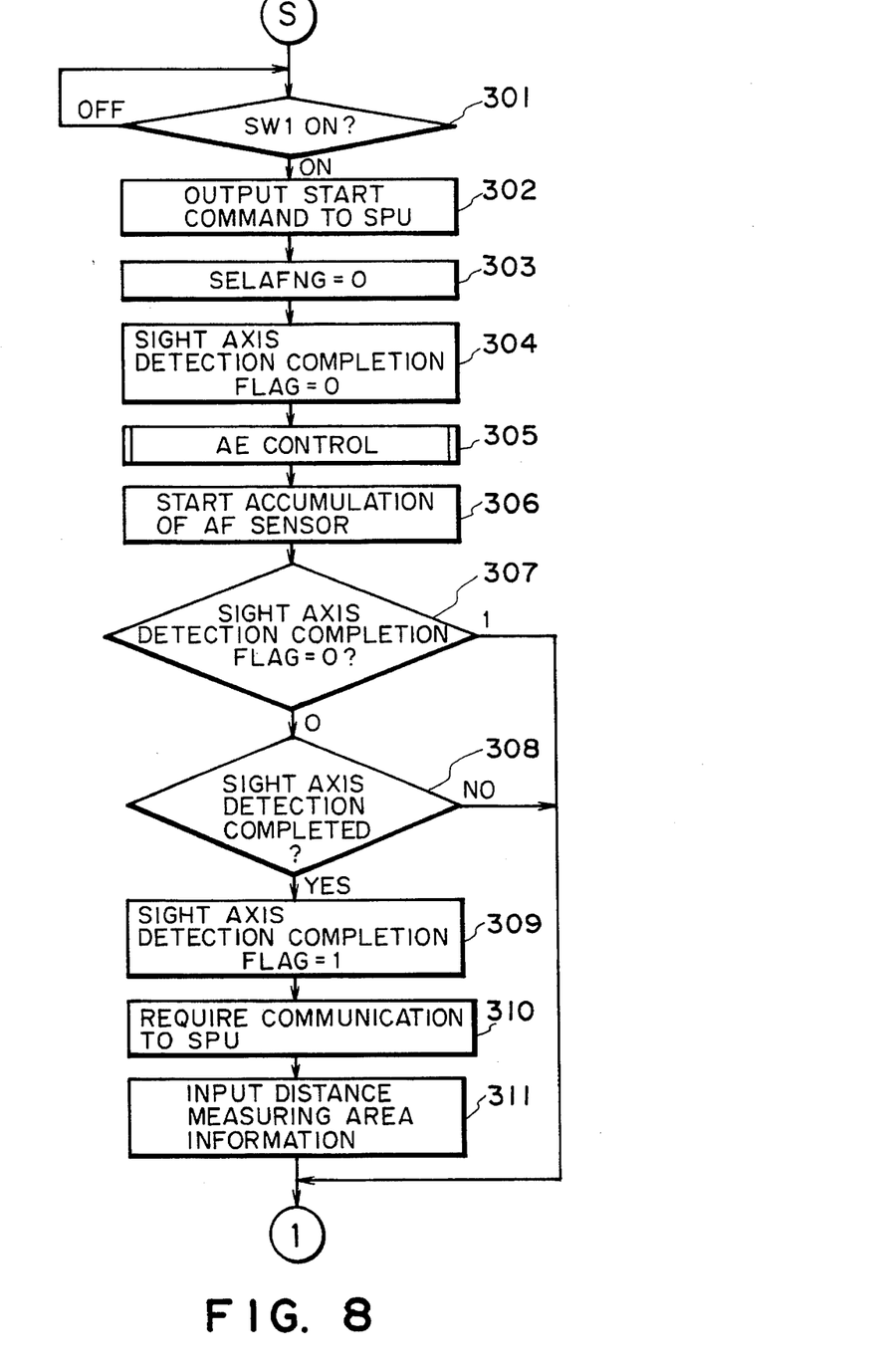
Figures 9, 9A:
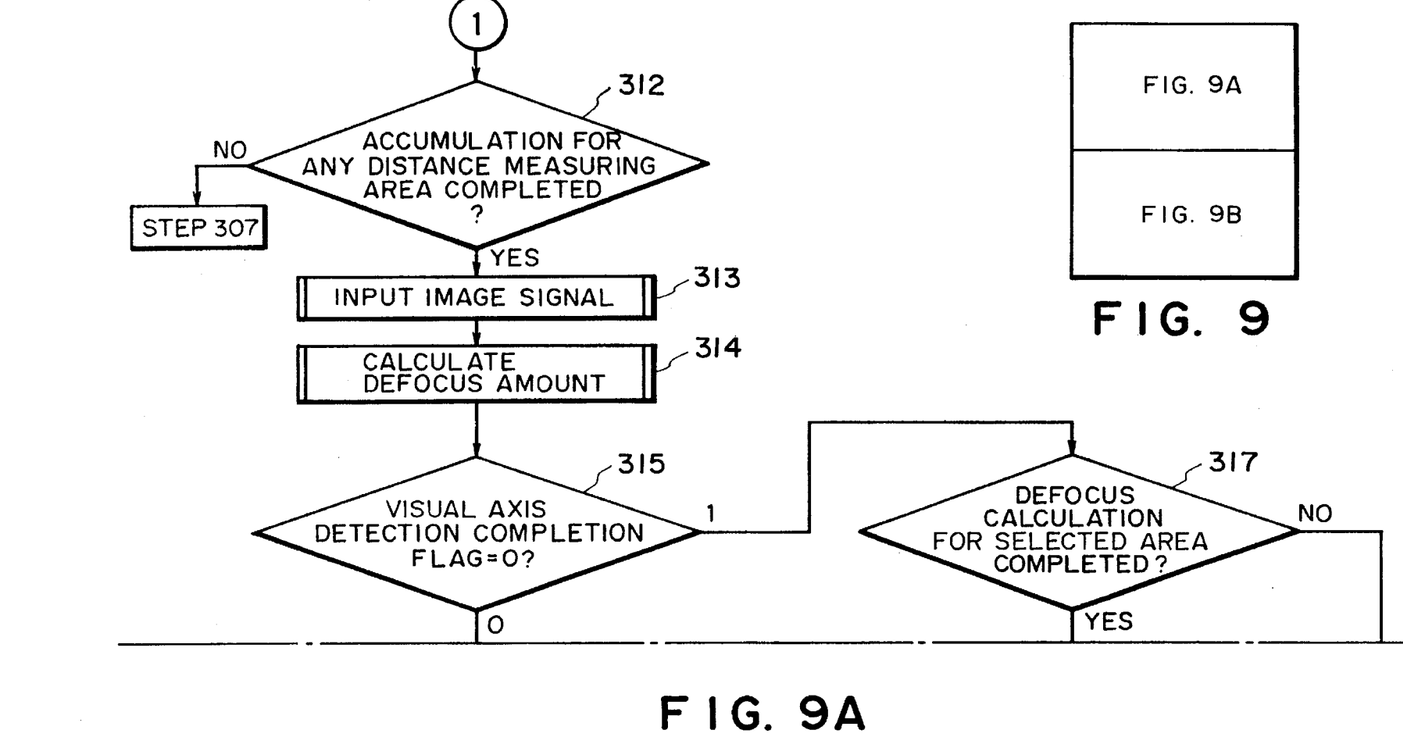
Figure 9B:
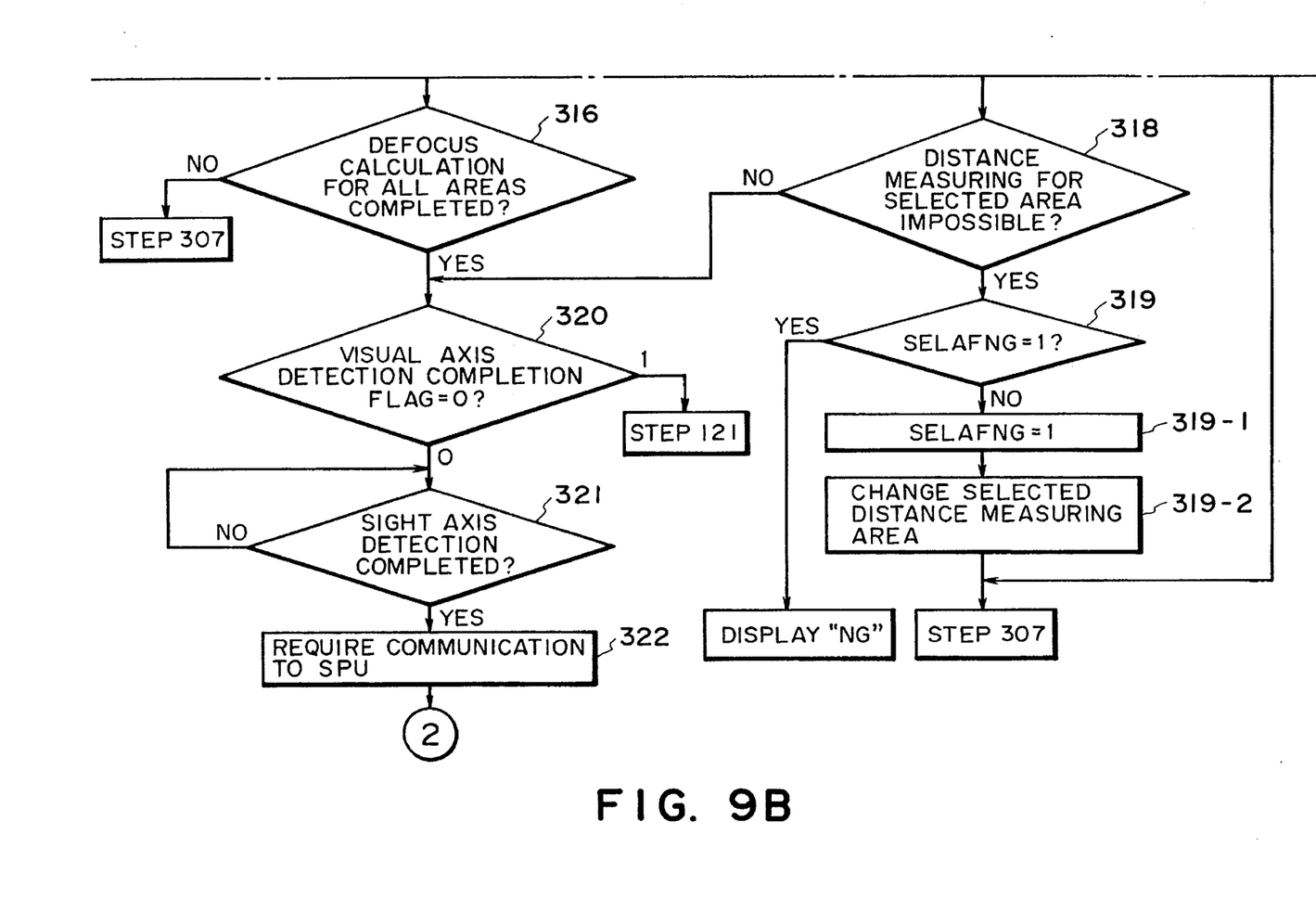

FIGS. 8 and 9 are flow charts of this embodiment.

When the camera receives basic operation signals, and the circuits shown in FIG. 3 receive a power supply voltage, the MPU 34 starts execution of processing from step 302 in FIG. 8. At the same time, the SPU 36 starts execution of processing from step 201 in FIG. 7, as has been described above. At this time, the MPU 34 and the SPU 36 respectively perform independent control operations.

The control of the MPU 34 will be described below with reference to the flow charts shown in FIGS. 8 and 9. In step 301 in FIG. 8, the state of the first switch SW1 which is turned on when the release button of the switch means 33 is depressed to its first-stroke position is checked. If the first switch SW1 is OFF, step 301 is repetitively executed until the first switch SW1 is turned on. If the first switch SW1 is ON, the flow advances to step 302.

In step 302, a command is output to the SPU 36 to cause it to execute sight axis detection.

The flow advances to step 303 to clear a flag SELAFNG. This flag SELAFNG indicates that a distance measurement operation with predetermined precision is disabled on the selected distance measuring area. The flow advances to step 304 to clear a sight axis detection completion flag. This flag indicates that the sight axis detection is completed, and distance measuring area information is input from the SPU 36.

The flow advances to step 305 to execute an "AE control" subroutine. In the "AE control" subroutine, known control operations such as photometry, detection of switch states, display, and the like are performed. However, since these control operations are not directly related to the present invention, a detailed description thereof will be omitted.

In step 306, the accumulation operation of AF sensors (focus detection sensors) is started to perform focus detection. In step 307, the sight axis detection completion flag is checked. If the flag is "1", since the distance measuring area information has already been input, the flow advances to step 312. If it is determined in step 307 that the flag is "0", since no distance measuring area information has been input yet, the flow advances to step 308 to check if the sight axis detection processed by the SPU 36 is completed. If N in step 308, the flow advances to step 312. However, if Y in step 308, the distance measuring area information based on the sight axis detection is input from the SPU 36.

In step 309, "1" is set in the sight axis detection completion flag to store that the distance measuring area information is stored. In step 310, a signal for requesting a communication of the distance measuring area information is output to the SPU 36. In step 311, the distance measuring area information is input from the SPU 36.

In step 312 in FIG. 9, it is checked if the accumulation of a sensor corresponding to one of the plurality of distance measuring areas is completed. If it is determined in step 312 that there is no sensor which has just completed the accumulation, the flow returns to step 307; otherwise, the flow advances to step 313 to input an image signal of an object of the corresponding distance measuring area.

In step 314, a defocus amount is calculated by a known method on the basis of the image signal of the object. A detailed description of a process for calculating the defocus amount will be omitted here. In step 315, the sight axis detection completion flag is checked. If it is determined in step 315 that the flag is "0", the flow advances to step 316; if the flag is "1", the flow advances to step 317.

In step 316, it is checked if the defocus calculations of all the distance measuring areas are completed. If it is determined in step 316 that a distance measuring area, for which a defocus calculation is not completed, still remains, the flow returns to step 307; otherwise, the flow advances to step 320.

It is checked in step 317 if the defocus calculation of the selected distance measuring area is completed. If N in step 317, the flow returns to step 307; otherwise, the flow advances to step 318.

In step 318, it is checked if the focusing state of the selected distance measuring area disables focus detection with predetermined precision. If N in step 318, the flow advances to step 320. If Y in step 318, it is checked in step 319 if the flag SELAFNG is "1" or "0". If the flag is not "1", "1" is set in the flag SELAFNG to perform an operation for switching a distance measuring area to the area neighboring the area obtained based on the gazing point of the photographer. If it is determined in step 319 that the flag is already "1", since the distance-measurement operation for the previous distance measuring area was also disabled, it is determined that the distance-measurement operation can no longer be performed, and an "NG" display is made in the finder of the camera.

With this control, even when the gazing point of the photographer slightly moves due to a camera shake in a camera holding state or due to an instantaneous fluctuation of the gazing point of the photographer, or when an object in an area selected by sight axis detection has a low contrast, a stable operation can be performed. Thereafter, the flow returns to step 307.

In step 320, the sight axis detection completion flag is checked. If the flag is "0", since no distance measuring area information has been input yet, the flow advances to step 321; if the flag is "1", since the distance measuring area information has already been input, the flow advances to step 121 in FIG. 6. In step 321, the control waits until the sight axis detection processing processed by the SPU 36 is completed. When the sight axis detection processing is completed, the flow advances to step 322, and a request signal for requesting a communication of the distance measuring area information is output to the SPU 36, as shown in FIG. 9.

As described above, according to the present invention, when the signal processing operations of a focus detection means and a sight axis detection means are independently performed, one signal processing operation is controlled upon completion of the other signal processing operation, as described above. In addition, when a distance measurement operation on a distance measuring area selected based on the gazing point of a photographer is disabled, the distance measuring area is switched to a neighboring area. Thus, a camera, which has the focus detection means and the sight axis detection means, can optimize the signal processing operations of the focus detection means and the sight axis detection means, and can perform both focus detection control and sight axis detection control in a short response time without considerably delaying the period of each detection control, can be realized.

What is claimed is:

1. A focus adjustment device for an objective lens, comprising:

multi-point focus state detection means for detecting focus states of said objective lens for a plurality of areas in a field;

sight point detection means for detecting a sight point state; and control means comprising multi-point focus state control means for executing a detection operation of said multi-point focus state detection means, and sight point control means for executing a detection operation of said sight point detection means, wherein said multi-point focus state control means and said sight point control means execute their respective operations in parallel.

2. A device according to claim 1, further comprising driving means for performing focus adjustment of said objective lens, and wherein when the detection operation of said sight point detection means is completed earlier than the detection operation of said multi-point focus state detection means, said control means detects a focus detection signal output corresponding to an area according to a detection signal from said sight point detection means, and thereafter, supplies the focus detection signal to said driving means; and when the detection operation of said multi-point focus state detection means is completed earlier than the detection operation of the sight point detection means, said control means supplies a focus detection signal output from said multi-point focus state detection means corresponding to an area which, in turn, corresponds to a detection signal when the detection signal is output from said sight point detection means.

3. A device according to claim 2, wherein when focus detection of said multi-point focus state detection means is disabled for the area corresponding to the detection signal output from said sight point detection means, said control means supplies a focus detection signal for an area neighboring the area to said driving means.

4. A focus adjustment system for an objective lens, comprising:

first conversion means for photoelectrically converting object light;

second conversion means for photoelectrically converting light reflected by an eye;

first signal processing means for performing signal processing of a signal from said first conversion means so as to provide distance measuring information relating to a plurality of areas;

second signal processing means for performing signal processing of a signal from said second conversion means so as to provide sight point information; and control means comprising first signal processing control means for executing processing operations of said first signal processing means and second signal processing control means for executing processing operations of said second signal processing means, wherein said first signal processing control means and said second signal processing control means execute their respective processing operations in parallel.

5. A system according to claim 4, further comprising driving means for driving said objective lens, and wherein after the processing operation of said first signal processing means for the area corresponding to the sight point information provided by said second signal processing means is completed, said control means provides the distance measuring information to said driving means.

6. A focus adjustment device for an objective lens, comprising:

focus state detection means for detecting focus states of said objective lens for a plurality of areas in a field;

sight point detection means for detecting a sight point state; and means for, when said focus state detection means cannot detect a focus state for the area corresponding to the sight point state detected by said sight point detection means, outputting a focus adjustment state of an area neighboring the corresponding area.

7. A camera having focus detection means and sight axis detection means, comprising:

sight axis detection means for detecting a gazing direction of a photographer who looks into a finder field of said camera;

focus detection means for detecting focusing states of a plurality of areas in the finder field of a photographing system; and control means for, when the focusing state of the photographing system is adjusted on the basis of a signal associated with the gazing direction obtained by said sight axis detection means and a signal indicating the focusing state from said focus detection means corresponding to a gazed at area, and when signal processing by said sight axis detection means is completed earlier than signal processing by said focus detection means, delaying the output of the signal indicating the focusing state until the signal processing by said focus detection means corresponding to a distance measuring area of the gazing direction obtained by said sight axis detection means is completed, and for, when the signal processing by said focus detection means is completed earlier than the signal processing by said sight axis detection means, delaying the output of the signal indicating the focusing state until the signal processing by said sight axis detection means is completed.

8. An apparatus comprising:

visual axis detecting means for detecting a visual axis;

controlling means for controlling said apparatus; and means for executing in parallel a detecting operation by said visual axis detecting means and a controlling operation by said controlling means.

9. An apparatus according to claim 8, wherein said controlling means measures a distance to a plurality of areas in a field.

10. An apparatus according to claim 8, further comprising an objective lens, and wherein said controlling means detects a focus adjusting state of said objective lens against a plurality of areas in a field.

11. A focus adjusting device for an objective lens, comprising:

distance measuring means for measuring a distance to a plurality of areas in a field;

visual axis detecting means for detecting a visual axis; and means for executing an adjustment of the objective lens by using distance measuring information relating to an area neighboring a particular area, which corresponds to the visual axis detected by said visual axis detecting means, when said distance measuring means is unable to execute distance measuring to the particular area.

12. A focus adjusting device for an objective lens, comprising:

first sensor means for receiving light from an object;

second sensor means for receiving light from an eye;

first signal processing means for executing signal-processing relating to a distance to the object based on an output of said first sensor means;

second signal processing means for executing signal-processing for obtaining a visual axis based on an output from said second sensor means; and means for executing in parallel processing operations of said first and second signal processing means.

13. A focus adjusting device for an objective lens according to claim 12, wherein each of said first and second signal processing means comprises an independent microprocessor unit.

14. A focus adjusting device for an objective lens according to claim 12, wherein said first signal processing means obtains a focus adjusting state of the objective lens.

* * * * *

UNITED STATES PATENT AND TRADEMARK OFFICE
CERTIFICATE OF CORRECTION

PATENT NO. : 5,497,210
DATED : March 5, 1996
INVENTOR(S) : YUKIO ODAKA

It is certified that error appears in the above-indentified patent and that said Letters Patent is hereby corrected as shown below:

IN THE DRAWINGS

Sheet 7,

Figure 7, "MEASUNING" should read --MEASURING--.

COLUMN 1

Line 17, "field; One" should read --field, one--.

Signed and Sealed this

Ninth Day of July, 1996

BRUCE LEHMAN

*Attest:*

*Attesting Officer*  Commissioner of Patents and Trademarks